US012559636B2

(12) United States Patent
Bohling et al.

(10) Patent No.: US 12,559,636 B2
(45) Date of Patent: Feb. 24, 2026

(54) METHOD FOR TUNING GLOSS IN PAINT FORMULATIONS

(71) Applicant: Rohm and Haas Company, Collegeville, PA (US)

(72) Inventors: James C. Bohling, Lansdale, PA (US); Ibrahim Eryazici, Phoenixville, PA (US); Philip R. Harsh, Birdsboro, PA (US); Partha S. Majumdar, Harleysville, PA (US); Edwin A. Nungesser, Horsham, PA (US); Teresa A. Phillips, Westhampton, NJ (US); Sharon M. Vuong, Downingtown, PA (US); Xiangyi Zhang, Phoenixville, PA (US)

(73) Assignee: Rohm and Haas Company, Collegeville, PA (US)

( * ) Notice: Subject to any disclaimer, the term of this patent is extended or adjusted under 35 U.S.C. 154(b) by 628 days.

(21) Appl. No.: 17/925,615

(22) PCT Filed: Jun. 21, 2021

(86) PCT No.: PCT/US2021/038237
§ 371 (c)(1),
(2) Date: Nov. 16, 2022

(87) PCT Pub. No.: WO2021/262590
PCT Pub. Date: Nov. 30, 2021

(65) Prior Publication Data

US 2023/0174801 A1 Jun. 8, 2023

Related U.S. Application Data

(60) Provisional application No. 63/114,126, filed on Nov. 16, 2020, provisional application No. 63/042,130, filed on Jun. 22, 2020.

(51) Int. Cl.

| | |
|---|---|
| ***C09D 7/80*** | (2018.01) |
| ***C09D 5/02*** | (2006.01) |
| ***C09D 7/40*** | (2018.01) |
| ***C09D 7/61*** | (2018.01) |
| ***C09D 7/65*** | (2018.01) |
| ***C09D 133/04*** | (2006.01) |

(52) U.S. Cl.
CPC ............... *C09D 7/80* (2018.01); *C09D 5/028* (2013.01); *C09D 7/61* (2018.01); *C09D 7/65* (2018.01); *C09D 7/67* (2018.01); *C09D 7/68* (2018.01); *C09D 7/69* (2018.01); *C09D 7/70* (2018.01); *C09D 133/04* (2013.01)

(58) Field of Classification Search
CPC ............. C09D 5/028; C09D 7/70; C09D 7/80
See application file for complete search history.

(56) References Cited

U.S. PATENT DOCUMENTS

| | | | | |
|---|---|---|---|---|
| 6,221,145 | B1 | 4/2001 | McClain | |
| 6,531,537 | B2 | 3/2003 | Friel et al. | |
| 6,689,824 | B2 | 2/2004 | Friel et al. | |
| 6,969,190 | B1 | 11/2005 | McClain et al. | |
| 7,612,129 | B2 | 11/2009 | Friel et al. | |
| 7,695,185 | B1 | 4/2010 | McClain et al. | |
| 7,919,546 | B2 | 4/2011 | Trevino, III et al. | |
| 9,920,194 | B2 | 3/2018 | Bohling et al. | |
| 9,994,722 | B2 | 6/2018 | Sheerin et al. | |
| 2018/0327562 | A1 | 11/2018 | Beshah et al. | |
| 2019/0177554 | A1* | 6/2019 | Bohling .................. | C09D 7/62 |
| 2019/0185687 | A1 | 6/2019 | Bohling et al. | |

FOREIGN PATENT DOCUMENTS

| | | | |
|---|---|---|---|
| EP | 2338613 | A1 | 6/2011 |

* cited by examiner

*Primary Examiner* — Vickey Nerangis

(57) ABSTRACT

The present invention relates to a method for preparing a multiplicity of containers of paints or pre-paints from separate vessels containing an aqueous solution of a rheology modifier, optionally an aqueous dispersion of an opacifying pigment, an aqueous dispersion of polymer particles, and an aqueous dispersion of organic polymeric microspheres. The process of the present invention provides a simple and cost-effective way of preparing a wide variety of a large quantity of contained and finished paints at point-of-sale.

15 Claims, No Drawings

METHOD FOR TUNING GLOSS IN PAINT FORMULATIONS

BACKGROUND OF THE INVENTION

The present invention relates to a method of tuning gloss in paint formulations. The method of the present invention is useful for achieving flexibility in preparing a wide variety of paint formulations at the point-of-sale.

Public demand for paints of different glosses and performance characteristics require retail stores to maintain inventories of large varieties and quantities of cans of paint. In response to these inventory pressures, retailers have attempted to develop a point-of-sale model, where paint is manufactured at the stores. However, without the quality controls and assurances provided by trained formulators, the commercial implementation of such a model has been elusive.

U.S. Pat. No. 6,689,824 (Friel) discloses the predetermined co-addition of pre-paints of opacifying pigment, inorganic extender, and binder into containers to make point-of-sale paints. The scope of the invention, however, is limited to the less complex road-marking paint formulations, which are only tinted to a limited range of colors, rather to a wide palette of colors available for architectural paint formulations.

U.S. Pat. No. 9,994,722 (Sheerin), in an effort to address the shortcomings of previous point-of-sale models, Sheerin proposes starting with prepared paints that are complete except for colorant and gloss, and adjusting the gloss and the color to more easily give paint a uniform color appearance at different glosses. Nevertheless, Sheerin's solution does not address the problem of inventory: Multiple cans of paints are still required and the only changes that are made in the final paints are to gloss and color. Moreover, the solution does not address a need for varying opacifying pigment (e.g., $TiO_2$) or binder type—acrylics versus styrene-acrylics versus vinyl acetates, for example—or binder concentration or the need to adjust viscosity in the final formulation, except to have more varieties of initial completely prepared paints. Accordingly, it would be an advantage in the field of point-of-sale paint preparation to develop an easy and versatile method of preparing a wide variety of paints at the point of sale that dramatically reduced, or even eliminated the need for an inventory of containers of paint.

SUMMARY OF THE INVENTION

The present invention has addressed a need in the art by providing a method of tuning gloss in paint formulations at point-of-sale comprising the steps of:

a) preparing a first paint at point-of-sale by dispensing into a first container, in any order or concurrently:
   i) an aqueous solution of a rheology modifier, from a first vessel;
   ii) an aqueous dispersion of opacifying pigment, from a second vessel;
   iii) an aqueous dispersion of polymer particles having a z-average particle size in the range of from 50 nm to 600 nm, from a third vessel; and
   iv) an aqueous dispersion of organic polymeric microspheres having a median weight average ($D_{50}$) particle size in the range of from 0.7 μm to 30 μm, from a fourth vessel; and
b) preparing a second paint at point-of-sale by dispensing into a second container, the rheology modifier, the opacifying pigment, the polymer particles, and the organic polymeric microspheres;

wherein the pigment volume concentration (PVC) of the organic microspheres in the first and second paints is in the range of from 5% PVC to 80% PVC, and the PVC of the first paint attributable to the organic microspheres is at least 5 PVC units different from the PVC of the second paint attributable to the organic microspheres.

In a second aspect, the present invention is a method comprising the steps of:

a) preparing a first paint or pre-paint by dispensing into a first container, in any order or concurrently:
   i) an aqueous solution of a rheology modifier, from a first vessel;
   ii) an aqueous dispersion of polymer particles having a z-average particle size in the range of from 50 nm to 600 nm, from a second vessel; and
   iii) an aqueous dispersion of organic polymeric microspheres having a median weight average ($D_{50}$) particle size in the range of from 0.7 μm to 30 μm, from a third vessel; and
b) preparing a second paint or pre-paint by dispensing into a second container, the rheology modifier, the polymer particles, and the organic polymeric microspheres;

wherein the pigment volume concentration (PVC) of the organic microspheres in the first and second paints or pre-paints is in the range of from 5% PVC to 80% PVC, and the PVC of the first paint or pre-paint attributable to the organic microspheres is at least 5 PVC units different from the PVC of the second paint or pre-paint attributable to the organic microspheres.

The method of the present invention provides a simple and cost-effective way of preparing a wide variety of paint at point-of-sale.

DETAILED DESCRIPTION OF THE INVENTION

The present invention is a method of tuning gloss in paint formulations at point-of-sale comprising the steps of:

a) preparing a first paint by dispensing into a first container, in any order or concurrently:
   i) an aqueous solution of a rheology modifier, from a first vessel;
   ii) an aqueous dispersion of opacifying pigment, from a second vessel;
   iii) an aqueous dispersion of polymer particles having a z-average particle size in the range of from 50 nm to 600 nm, from a third vessel; and
   iv) an aqueous dispersion of organic polymeric microspheres having median weight average particle size ($D_{50}$) in the range of from 0.7 μm to 30 μm, from a fourth vessel; and
b) preparing a second paint by dispensing into a second container, the rheology modifier, the opacifying pigment, the polymer particles, and the organic polymeric microspheres;

wherein the pigment volume concentration (PVC) of the organic microspheres in the first and second paints is in the range of from 5% PVC to 80% PVC, and the PVC of the first paint attributable to the organic microspheres is at least 5 PVC units different from the PVC of the second paint attributable to the organic microspheres.

Examples of suitable rheology modifiers dispensed from the first vessel include hydrophobically modified ethylene oxide urethane polymers (HEURs); hydrophobically modified alkali swellable emulsion (HASEs); alkali swellable emulsions (ASEs); and hydroxyethyl cellulosics (HECs), and hydrophobically modified hydroxyethyl cellulosic (HMHECs); and combinations thereof. If more than one rheology is desired, it is advantageous to use one or more additional vessels to control the amounts of the different rheology modifiers independently. The amount of the solution of the rheology modifier added to the paint container is readily predetermined to achieve the desired viscosity of the final untinted paint.

Suitable opacifying pigments dispensed from the second vessel are inorganic opacifying pigments having a refractive index of greater than 1.90, including $TiO_2$ and ZnO, with $TiO_2$ being preferred. The PVC of the $TiO_2$ is tunable to the desired brightness level. Other opacifying pigments include organic opacifying pigments such as opaque polymers, which may be used as a replacement for or as a supplement to inorganic pigments; if used as a supplement, the organic opacifying pigments and are advantageously added to the paint containers from a separate vessel. ROPAQUE™ ULTRA Opaque Polymers and AQACell HIDE 6299 Opaque Polymers are commercial examples of opaque polymers.

The aqueous dispersion of polymer particles (latexes) dispensed from the third vessel have a z-average particle size by dynamic light scattering in the range of preferably 50 nm to 600 nm. Examples of suitable polymeric dispersions include acrylic, styrene-acrylic, urethane, alkyd, and vinyl ester (e.g., vinyl acetate and vinyl versatate) polymeric dispersions and combinations thereof. Acrylic and styrene-acrylic polymeric dispersions typically have a z-average particle size in the range of from 70 nm to 300 nm, while vinyl ester latexes generally have a z-average particle size in the range of from 300 nm to 550 nm as measured using dynamic light scattering. If it is desirable to add more than one kind of latex to the same paint container, the latexes are preferably added from separate vessels.

Acrylic latexes preferably comprise aqueous dispersions of polymer particles functionalized with methyl methacrylate and one or more acrylates selected from the group consisting of methyl acrylate, ethyl acrylate, n-butyl acrylate, 2-ethylhexyl acrylate, and 2-propylheptyl acrylate. As used herein, the term "structural unit" of a recited monomer refers to the remnant of the monomer after polymerization. For example, a structural unit of n-butyl acrylate is as illustrated:

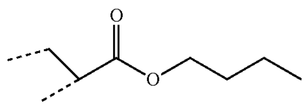

structural unit of n-butyl acrylate where the dotted lines represent the points of attachment of the structural unit to the polymer backbone.

Acrylic latexes also preferably comprise structural units of an acid monomer including carboxylic acid, sulfur acid, and phosphorus acid monomers, as well as salts thereof, and combinations thereof. Examples of suitable carboxylic acid monomers include methacrylic acid, acrylic acid, and itaconic acid and salts thereof; examples of suitable sulfur acid monomers include sulfoethyl methacrylate, sulfopropyl methacrylate, styrene sulfonic acid, vinyl sulfonic acid, and 2-acrylamido-2-methyl propanesulfonic acid, and salts thereof; examples of suitable phosphorus acid monomers include phosphonates and dihydrogen phosphate esters of an alcohol in which the alcohol contains or is substituted with a polymerizable vinyl or olefinic group. Preferred dihydrogen phosphate esters are phosphates of hydroxyalkyl acrylates or methacrylates, including 2-phosphoethyl methacrylate (PEM) and salts thereof.

In one embodiment of the method of the present invention, the aqueous dispersion of polymer particles dispensed from the second vessel comprises an aqueous dispersion of acrylic polymer particles functionalized with a carboxylic acid monomer and a phosphorus acid monomer; in yet another embodiment, the acrylic polymer particles comprise a shell with a protuberating PEM-functionalized core. The aqueous dispersion of polymer particles dispensed from the second vessel may comprise a bimodal distribution of acrylic polymer particles with a shell with a protuberating PEM-functionalized core, and acrylic polymers that do not have a protuberating core. Such bimodal dispersions and their preparation are disclosed in U.S. Pat. No. 9,920,194.

The organic polymeric microspheres dispensed from the fourth vessel have a median weight average particle size ($D_{50}$) in the range of from 0.7 μm, preferably from 1 μm, and more preferably from 2 μm, and most preferably from 4 μm, to 30 μm, preferably to 20 μm, more preferably to 13 μm, and most preferably to 10 μm, as measured using a Disc Centrifuge Photosedimentometer (DCP). These organic polymeric microspheres are characterized by being non-film-forming and preferably having a crosslinked low $T_g$ core, that is, a crosslinked core having a $T_g$, as calculated by the Fox equation, of not greater than 25° C., more preferably not greater than 15° C., and more preferably not greater than 10° C.

The crosslinked core of the organic polymeric microspheres preferably comprises structural units of one or more monoethylenically unsaturated monomers whose homopolymers have a $T_g$ of not greater than 20° C. (low $T_g$ monomers) such as methyl acrylate, ethyl acrylate, n-butyl acrylate, and 2-ethylhexyl acrylate. Preferably, the crosslinked low $T_g$ core comprises, based on the weight of the core, from 50, more preferably from 70, more preferably from 80, and most preferably from 90 weight percent, to preferably 99, and more preferably to 97.5 weight percent structural units of a low $T_g$ monoethylenically unsaturated monomer. n-Butyl acrylate, and 2-ethylhexyl acrylate are preferred low $T_g$ monoethylenically unsaturated monomers used to prepare the low $T_g$ core.

The crosslinked core further comprises structural units of a multiethylenically unsaturated monomer, examples of which include allyl methacrylate, allyl acrylate, divinyl benzene, trimethylolpropane trimethacrylate, trimethylolpropane triacrylate, butylene glycol (1,3) dimethacrylate, butylene glycol (1,3) diacrylate, ethylene glycol dimethacrylate, and ethylene glycol diacrylate. The concentration of structural units of the multiethylenically unsaturated monomer in the crosslinked microspheres is preferably in the range of from 1, more preferably from 2 weight percent, to 9, more preferably to 8, and most preferably to 6 weight percent, based on the weight of the core.

The crosslinked polymeric core is preferably clad with high a $T_g$ shell, that is, a shell having a $T_g$ of at least 50° C., more preferably at least 70° C., and most preferably at least 90° C. The shell preferably comprises structural units of monomers whose homopolymers have a $T_g$ greater than 70° C. (high $T_g$ monomers), such as methyl methacrylate, styrene, isobornyl methacrylate, cyclohexyl methacrylate, and t-butyl methacrylate. The high $T_g$ shell preferably comprises at least 90 weight percent structural units of methyl methacrylate.

The organic polymeric microspheres, preferably microspheres comprising a crosslinked low $T_g$ core clad with a high $T_g$ shell, may further comprise, based on the weight of the microspheres, from 0.05 to 5 percent structural units of a polymerizable organic phosphate represented by the structure of Formula I:

I

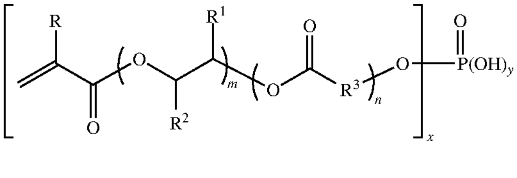

or a salt thereof; wherein R is H or $CH_3$, wherein $R^1$ and $R^2$ are each independently H or $CH_3$, with the proviso that $CR^2CR^1$ is not $C(CH_3)C(CH_3)$; each $R^3$ is independently linear or branched $C_2$-$C_6$ alkylene; m is from 1 to 10; n is from 0 to 5; with the proviso that when m is 1, then n is from 1 to 5; x is 1 or 2; and y is 1 or 2; and x+y=3.

When n is 0, x is 1, and y is 2, the polymerizable organic phosphate or salt thereof is represented by the structure of Formula II:

II

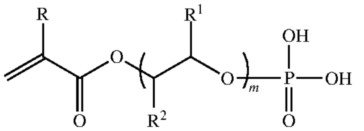

Preferably, each $R^1$ is H, and each $R^2$ is H or $CH_3$; m is preferably from 3, and more preferably from 4; to preferably to 8, and more preferably to 7. Sipomer PAM-100, Sipomer PAM-200 and Sipomer PAM-600 phosphate esters are examples of commercially available compounds within the scope of the compound of Formula II.

Where n is 1; m is 1; R is $CH_3$; $R^1$ and $R^2$ are each H; $R^3$ is $-(CH_2)_5-$; x is 1 or 2; y is 1 or 2; and x+y=3, the polymerizable organic phosphate or salt thereof is represented by the structure of Formula III:

III

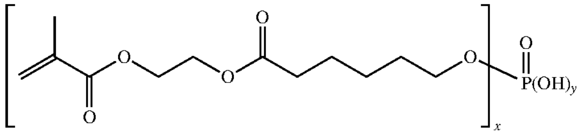

A commercially available compound within the scope of Formula III is Kayamer PM-21 phosphate ester.

The organic polymeric microspheres may also comprise 0.05 to 5 weight percent, based on the weight of the microspheres, structural units of an ethylene oxide salt of a distyryl or a tristyryl phenol represented by the structure of Formula IV:

IV

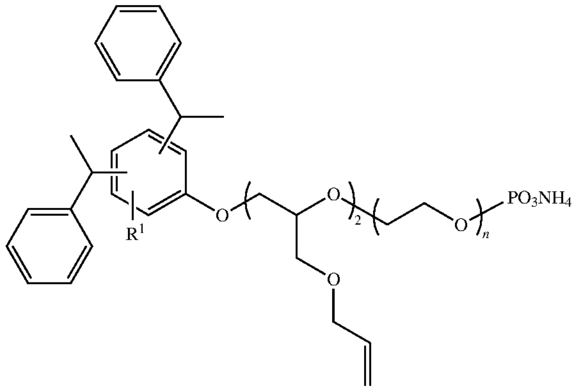

where $R^1$ is H, $CH_2CR{=}CH_2$, $CH{=}CHCH_3$, or 1-phenethyl; R is $C_1$-$C_4$-alkyl; and n is 12 to 18. A commercial example of the structure of Formula IV is E-Sperse RS-1684 reactive surfactant.

The organic polymeric microspheres are distinct from opaque polymers, which comprise water-containing cores that form voided polymer particles after application of the dispersion onto a substrate, followed by evaporation.

In addition to the components dispensed from the four vessels, other materials including defoamers, surfactants, biocides, coalescents, dispersants, colorants, other polymeric organic microspheres, other polymer particles, and water are also advantageously dispensed along with a component in any or all of the four vessels or dispensed from one or more separate vessels. Moreover, it is possible and often advantageous to stabilize the aqueous dispersion of organic polymeric microspheres in the fourth vessel with a stabilizing amount of a rheology modifier, which may be the same as or different from the rheology modifier dispensed from the first vessel. In one embodiment, the stabilizing rheology modifier is an alkali swellable emulsion or a hydrophobically modified alkali swellable emulsion or both; in another embodiment, the rheology modifier dispensed from the first vessel is a HEUR.

The amount of organic polymeric microspheres dispensed from the fourth vessel may vary widely depending on the sheen desired for the final paint. Microsphere PVC is calculated in accordance with the following formula:

$$\text{Microsphere } PVC = \left[\frac{Vol \text{ Microspheres}}{Vol \text{ Opacifying Pigment+Extender+Binder}}\right] \times 100$$

where binder refers to the contribution of polymer from the aqueous dispersion of the polymer particles that bind the pigment and extender particles together, and extender refers to the volume of non-opacifying extenders, including polymeric organic microspheres and inorganic extenders.

Although the formula for calculating PVC includes the contribution from an inorganic extender, it is generally, but not always, undesirable to use inorganic extenders in the process of the present invention. Inorganic extenders such as talc, clay, mica, sericite, $CaCO_3$, nepheline, feldspar, wollastonite, kaolinite, dicalcium phosphate, and diatomaceous earth are natural materials that require labor and energy intensive processes including extraction from natural deposit sites and refinement into powders having broad particle sizes and shapes. The high density powders are then transported to coating manufacturing plants for further high energy grinding to de-aggregate particles into useful primary particle sizes. The resultant inorganic extenders are high surface area materials with varying surface shapes and surface energies requiring specialized formulating with binders, thickeners, and additives to overcome the quality control challenges inherent in the extraction-refinement-grinding processes. Thus, reliance on inorganic extenders to produce a multiplicity of paints in a point-of-sale model, even at a single sheen, creates a logistical roadblock for the successful implementation of such a model.

In contrast, the polymeric organic microspheres of the present invention avoid the complexities associated with inorganic extenders. Polymeric microspheres can readily be prepared with uniform shape at a desired size and surface energy, thereby providing ease and consistency to the paint manufacturing processes.

Accordingly, the dispensing of an inorganic extender is preferably limited so that its PVC contribution is preferably not greater than 10 PVC, more preferably not greater than 5 PVC, more preferably not greater than 1 PVC, and most preferably 0 PVC, with the proviso that the PVC contribution from the inorganic extender does not exceed the PVC of contribution from the polymeric organic microspheres.

The PVC of the organic microspheres is different in a second container by at least 5 PVC units. As used herein, "5 PVC units" refers to the difference in percent contribution of organic microspheres between the paints; for example, the difference between 10% PVC and 15% PVC is a difference of 5 PVC units. It is understood that the process of the present invention is useful the preparation for as many containers of paint as is desired and for any desired PVC, provided that there is a difference of at least 5 PVC units between a first container of paint and at least one other container of paint. Thus, the preparation of a second paint in a second container refers to another container following, but not necessarily directly following, the preparation of paint in a first container. Significantly, the KU viscosity of the second paint is readily tunable to substantially the same KU viscosity the first paint, without a significant increase in the loading of rheology modifier dispensed from the first vessel.

In another embodiment, the difference in PVC levels between paints in the first and second containers attributable to the difference in polymeric microsphere levels is at least 10 PVC units; or at least 15 PVC units; or at least 20 PVC units; or at least 30 PVC units. In another embodiment, the density of the prepared paints is substantially the same; that is, paint density does not vary more than 5%, preferably not more than 2%, over at least a 10, more preferably at least a 20, and most preferably at least a 30 PVC range, at a constant opacifying pigment PVC.

In a second aspect, the present invention is a method comprising the steps of a) preparing a first paint or pre-paint by dispensing into a first container, in any order or concurrently:
   i) an aqueous solution of a rheology modifier, from a first vessel;
   ii) an aqueous dispersion of polymer particles having a z-average particle size in the range of from 50 nm to 600 nm, from a second vessel; and
   iii) an aqueous dispersion of organic polymeric microspheres having a median weight average ($D_{50}$) particle size in the range of from 0.7 μm to 30 μm, from a third vessel; and
b) preparing a second paint or pre-paint by dispensing into a second container, the rheology modifier, the polymer particles, and the organic polymeric microspheres;

wherein the pigment volume concentration (PVC) of the organic microspheres in the first and second paints or pre-paints is in the range of from 5% PVC to 80% PVC, and the PVC of the first paint attributable to the organic microspheres is at least 5 PVC units different from the PVC of the second paint attributable to the organic microsphere. This aspect of the present invention is useful for preparing pre-paints or paints. Materials may be dispensed into the containers from the vessels in a variety of ways, including with the assistance a user interface and a controller as described in U.S. Pat. Nos. 7,695,185 and 6,969,190.

As the following examples and comparative examples will demonstrate, the use of polymeric organic pigment in place of inorganic extenders provides a pronounced advantage in formulating multiple containers of paint, beyond logistical advantages.

EXAMPLES

Intermediate Example—Preparation of Dispersion of Acrylic Microspheres

The microspheres used in Examples 1 to 3 were prepared as described in US 2019/185687, Intermediate Example 2 [para 0060], and adjusted to 43.5% solids. The particle size was 8.7 μm as measured by DCP, as described in para [0063] of US 2019/185687.

Comparative Examples 1 to 3 illustrate formulations for preparing paints using rheology modifiers, binders, opacifying pigment, and inorganic extenders at different PVCs. Examples 1 to 3 illustrate the preparation of paints containing acrylic microspheres at different PVCs. Table 1 illustrates the formulations and various properties of each paint. Examples 1 to 3 were prepared by adding ingredients to separate containers, then sealing each container and mixing the contents for 3 min using a gyroscopic mixer. Comparative Examples 1-3 were prepared by adding Extender Grind and other ingredients to a separate container and mixing the contents for 3 min using a gyroscopic mixer. In each example, Binder refers to EVOQUE™ 3390 All Acrylic Binder; $TiO_2$ refers to Kronos 4311 $TiO_2$ Slurry; Inorganic Extender refers to Extender Grind 65 inorganic extender prepared separately using a high speed disperser (Minex 3 nepheline syenite (42.6%), Omyacarb UF $CaCO_3$ (17.0%); Diafil 525 Diatomaceous Earth (5.5%); and water (32%); TAMOL™ 731A Dispersant); Defoamer refers to Byk-024 Defoamer; RM1 refers to ACRYSOL™ RM-2020 NPR; and RM2 refers to ACRYSOL™ RM-8W. (EVOQUE, TAMOL, and ACRYSOL are Trademarks of The Dow Chemical Company or its Affiliates.)

TABLE 1

| Paint Formulations | | | | | | |
|---|---|---|---|---|---|---|
| Materials (g) | Comp Ex 1 | Comp Ex 2 | Comp Ex 3 | Ex 1 | Ex 2 | Ex 3 |
| Binder | 264.97 | 191.37 | 117.77 | 264.94 | 191.35 | 117.75 |
| $TiO_2$ | 147.83 | 147.83 | 147.83 | 147.82 | 147.82 | 147.82 |
| Inorg Extender | 62.49 | 187.46 | 312.43 | — | — | — |
| Microspheres | — | — | — | 40.65 | 121.96 | 203.27 |
| $NH_3$ (28% aq) | 0.14 | 0.00 | 0.00 | 0.30 | 0.11 | 0.00 |
| BYK-024 | 0.50 | 0.50 | 0.50 | 0.50 | 0.50 | 0.50 |
| RM1 | 4.87 | 7.93 | 16.85 | 4.01 | 3.62 | 6.68 |
| RM2 | 1.20 | 1.11 | 4.53 | 0.88 | 0.90 | 1.87 |
| Water | 60.88 | 52.66 | 35.00 | 59.85 | 51.11 | 38.08 |
| Total Wt. (g) | 542.88 | 588.86 | 634.91 | 518.95 | 517.36 | 515.97 |

TABLE 1-continued

Paint Formulations

| Materials (g) | Comp Ex 1 | Comp Ex 2 | Comp Ex 3 | Ex 1 | Ex 2 | Ex 3 |
|---|---|---|---|---|---|---|
| Total PVC (%) | 28.00 | 48.00 | 68.00 | 28.00 | 48.00 | 68.00 |
| $TiO_2$ PVC (%) | 18.00 | 18.00 | 18.00 | 18.00 | 18.00 | 18.00 |
| Vol Solids (%) | 38.00 | 38.00 | 38.02 | 38.00 | 38.00 | 37.99 |
| Wt Solids (%) | 52.24 | 55.84 | 58.92 | 50.12 | 49.96 | 49.77 |
| Density g/mL | 1.30 | 1.41 | 1.52 | 1.24 | 1.24 | 1.24 |

Comparative Examples paints 1 to 3 show significant increases in densities with the increase of the inorganic extender PVC, whereas the densities of Example paints 1 to 3 are nearly identical. Thus, the paints prepared by the process of the present invention, especially at high PVCs, relieve consumers of toting unnecessary weight.

Table 2 illustrates the change in rheology modifier demand visa vis the variation in PVC of inorganic extender and polymeric organic microspheres required to reach a targeted KU viscosity in the prepared paints. ASTM D562-10 was followed to measure KU viscosity of the paints using a Stormer viscometer. Gloss was measured by the following procedure: Drawdowns of the coatings were prepared at 25° C. and 50% relative humidity (RH) using a 3-mil bird applicator over a white Leneta chart. The coatings were dried for 24 h at 25° C. and 50% RH before performing gloss measurements. ASTM D-523 was followed to measure gloss values using a BYK micro-TRI-gloss meter. Gloss 60° refers to the measured gloss values at a 60° angle. $PVC_{TiO2}$ refers to the PVC attributable to the $TiO_2$ concentration; $PVC_{ext}$ refers to the PVC attributable to the inorganic extender or the polymeric microspheres. $KU_i$ refers to the initial KU viscosity; $KU_{equib}$ refers to the equilibrated viscosity measured after 3 d.

TABLE 2

Rheology Modifier Demand Study

| | Comp Ex 1 | Comp Ex 2 | Comp Ex 3 | Ex 1 | Ex 2 | Ex 3 |
|---|---|---|---|---|---|---|
| $PVC_{TiO_2}$ | 18 | 18 | 18 | 18 | 18 | 18 |
| $PVC_{ext}$ | 10 | 30 | 50 | 10 | 30 | 50 |
| Total PVC | 28 | 48 | 68 | 28 | 48 | 68 |
| $KU_i$ | 109 | 105.4 | 97.7 | 108.2 | 107.4 | 108.6 |
| $KU_{equib}$ | 123.2 | 127.5 | 121.4 | 114.2 | 112.8 | 116.6 |
| ΔKU | 14.2 | 22.1 | 23.7 | 6 | 5.4 | 8 |
| Gloss 60° | 21.06 | 4.09 | 2.40 | 22.20 | 5.29 | 2.99 |

It has been surprisingly discovered that the initial KU viscosity of each paint prepared using the method of the present invention are tunable within 2 KU units, preferably within 1 KU unit, of each formulated paint without overloading the formulation with rheology modifier. Moreover, density uniformity of the prepared paints is observed over a range of 40 PVC units attributable to the polymeric organic microspheres, and at a constant opacifying pigment PVC. The ability to target uniform density and a desired KU viscosity over a range of at least 40 PVC units increases the chances of successful implementation of a point-of-sale model for making a large quantity of a wide variety of paints. That data show that higher loadings of rheology modifier are required to reach target KUs, especially for higher PVC paints, when inorganic pigment is used as the extender. The consequent coatings exhibit poorer paint stability, as evidenced by the large ΔKU values for the comparative paints in the equilibrium studies. Furthermore, water and stain resistance in coatings is often adversely affected with greater loadings of rheology modifiers.

The invention claimed is:

1. A method of tuning gloss in paint formulations at point-of-sale comprising the steps of:

a) preparing a first paint at point-of-sale by dispensing into a first container, in any order or concurrently:

i) an aqueous solution of a rheology modifier, from a first vessel;

ii) an aqueous dispersion of opacifying pigment, wherein the opacifying pigment is $TiO_2$, from a second vessel;

iii) an aqueous dispersion of polymer particles having a z-average particle size in the range of from 50 nm to 600 nm, from a third vessel; and iv) an aqueous dispersion of organic polymeric microspheres having a median weight average ($D_{50}$) particle size in the range of from 0.7 μm to 30 μm, from a fourth vessel;

b) preparing a second paint at point-of-sale by dispensing into a second container, the aqueous solution of the rheology modifier from the first vessel, the aqueous dispersion of the opacifying pigment from the second vessel, the aqueous dispersion of the polymer particles from the third vessel, and the aqueous dispersion of the organic polymeric microspheres from the fourth vessel;

c) optionally preparing at least one additional paint from the vessels, which at least one additional paint is prepared after the second paint, or between the first paint and the second paint;

wherein the pigment volume concentration (PVC) of the organic polymeric microspheres in the first and second paints is in the range of from 5% PVC to 80% PVC, and the PVC of the paint in the second container attributable to the organic polymeric microspheres is at least 15 PVC units different from the PVC of the paint in the first container attributable to the organic microspheres;

wherein the initial KU viscosity of the second paint is within 2 KU units of the initial KU viscosity of the first paint at a constant $TiO_2$ PVC;

wherein the ΔKU viscosity of the paints is 8 KU units or less wherein ΔKU is the difference in initial KU viscosity and equilibrated KU viscosity after 3 days; and wherein the PVC contribution of inorganic extender dispensed into the first paint, the second paint, and the at least one additional paint at point-of-sale does not exceed 1 PVC.

2. The method of claim 1 wherein the rheology modifier dispensed from the first vessel is selected from the group consisting of hydrophobically modified ethylene oxide urethane polymers (HEURs); hydrophobically modified alkali swellable emulsion (HASEs); alkali swellable emulsions (ASEs); hydroxyethyl cellulosics (HECs), and hydrophobically modified hydroxyethyl cellulosic (HMHECs).

3. The method of claim 2 wherein the aqueous dispersion of polymer particles dispensed from the third vessel is an aqueous dispersion of acrylic polymer particles having a z-average particle size in the range of from 70 nm to 300 nm.

4. The method of claim 2 wherein the aqueous dispersion of polymer particles dispensed from the third vessel is an aqueous dispersion of acrylic polymer particles comprising structural units of methyl methacrylate and one or more acrylates selected from the group consisting of methyl acrylate, ethyl acrylate, n-butyl acrylate, 2-ethylhexyl acrylate, and 2-propylheptyl acrylate;

wherein the acrylic polymer particles have a z-average particle size in the range of from 70 nm to 300 nm; and wherein the rheology modifier dispensed from the first vessel is a HEUR.

5. The method of claim 4 wherein the acrylic polymer particles further comprise structural units of a carboxylic acid monomer and 2-phosphoethyl methacrylate.

6. The method of claim 5 wherein the acrylic polymer particles comprise a shell with a protuberating 2-phosphoethyl methacrylate-functionalized core or a mixture of acrylic polymer particles comprising a shell with a protuberating 2-phosphoethyl methacrylate-functionalized core and acrylic polymer particles that do not have a protuberating core.

7. The method of claim 4 wherein the organic polymeric microspheres dispensed from the fourth vessel have a $D_{50}$ particle size in the range of from 4 μm to 10 μm; and wherein organic polymeric microspheres comprise non-film-forming crosslinked cores having a $T_g$, as calculated by the Fox equation, of not greater than 15° C., which cores comprise, based on the weight of the cores, 90 to 99 weight percent structural units of n-butyl acrylate and from 1 to 9 weight percent structural units of a multiethylenically unsaturated monomer.

8. The method of claim 5 wherein the organic polymeric microspheres dispensed from the fourth vessel have a $D_{50}$ particle size in the range of from 4 μm to 10 μm; wherein the organic polymeric microspheres comprise non-film-forming crosslinked cores having a $T_g$, as calculated by the Fox equation, of not greater than 10° C., which cores comprise, based on the weight of the cores, 90 to 99 weight percent structural units of n-butyl acrylate and from 1 to 9 weight percent structural units of a multiethylenically unsaturated monomer; and wherein the crosslinked cores are clad with shells having a $T_g$ of at least 70° C.

9. The method of claim 8 wherein the crosslinked cores are clad with shells comprising at least 90 weight percent structural units of methyl methacrylate; and wherein the polymeric microspheres further comprise, based on the weight of the microspheres, from 0.05 to 5 percent structural units of a polymerizable organic phosphate represented by the structure of Formula I:

I

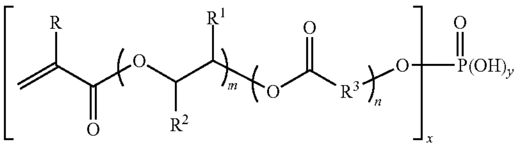

or a salt thereof; wherein R is H or $CH_3$, $R^1$ and $R^2$ are each independently H or $CH_3$, with the proviso that $CR^2CR^1$ is not $C(CH_3)C(CH_3)$; each $R^3$ is independently linear or branched $C_2$-$C_6$ alkylene; m is from 1 to 10; and n is from 0 to 5; with the proviso that when m is 1, then n is from 1 to 5; x is 1 or 2; and y is 1 or 2; and x+y=3.

10. The method of claim 8 wherein the crosslinked cores comprise from 90 to 99 weight percent structural units of n-butyl acrylate and from 1 to 9 weight percent allyl methacrylate; wherein the crosslinked cores are clad with shells comprising at least 90 weight percent structural units of methyl methacrylate; and wherein the polymeric microspheres further comprise, based on the weight of the microspheres, from 0.05 to 5 percent structural units of a polymerizable organic phosphate represented by the structure of either Formula II:

II

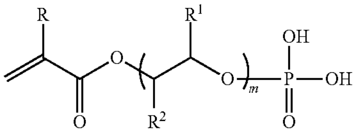

where R is H or $CH_3$; each $R^1$ is H; each $R^2$ is H or $CH_3$; m is from 3 to 8;

or the structure of Formula III:

III

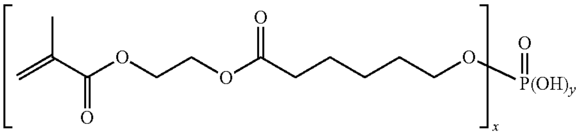

wherein the organic microspheres are stabilized with an alkali swellable emulsion.

11. The method of claim 1 wherein the aqueous dispersion of polymer particles dispensed from the third vessel is an aqueous dispersion of acrylic, styrene-acrylic, urethane, alkyd, or vinyl ester polymer particles; wherein the PVC contribution of inorganic extender dispensed into the first and the second paints at point-of-sale does not exceed 1 PVC.

12. The method of claim 11 wherein the organic polymeric microspheres dispensed from the fourth vessel have a $D_{50}$ particle size in the range of from 2 μm to 13 μm; and wherein the organic polymeric microspheres comprise non-film-forming crosslinked cores having a $T_g$, as calculated by the Fox equation, of not greater than 15° C., which cores comprise structural units of one or more monoethylenically unsaturated monomers selected from the group consisting of as methyl acrylate, ethyl acrylate, n-butyl acrylate, and 2-ethylhexyl acrylate; and structural units of a multiethylenically unsaturated monomer.

13. The method of claim 1 wherein the organic polymeric microspheres dispensed from the fourth vessel have a $D_{50}$ particle size in the range of from 1 μm to 20 μm; and wherein the organic polymeric microspheres comprise non-film-forming crosslinked cores having a $T_g$, as calculated by the Fox equation, of not greater than 25° C.

14. The method of claim 1 which further comprises dispensing from one or more of the first, the second, the third, and the fourth vessels, or dispensing from one or more additional vessels, one or more materials selected from the group consisting of defoamers, surfactants, biocides, coalescents, dispersants, and colorants.

15. The method of claim 1 wherein the density of the paints does not vary more than 5% over at least a 20 PVC range at a constant $TiO_2$ PVC.

* * * * *